July 26, 1955     E. A. KRODER     2,713,871
AUTOMATIC VENT VALVE
Filed April 22, 1950
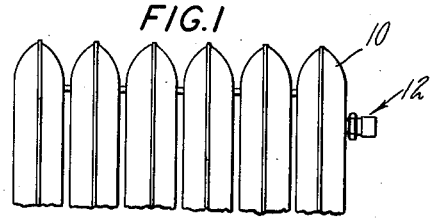
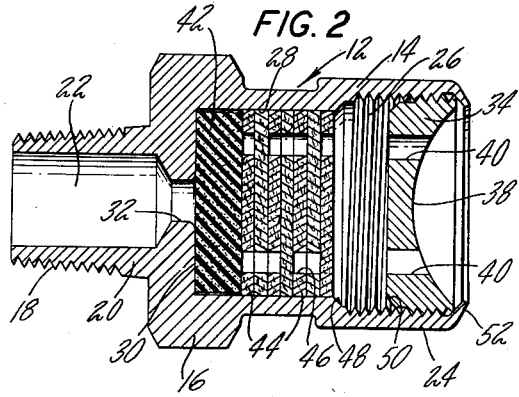
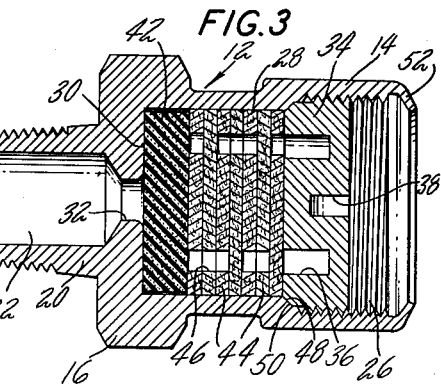
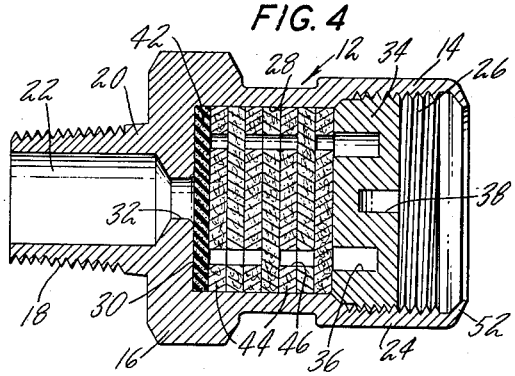
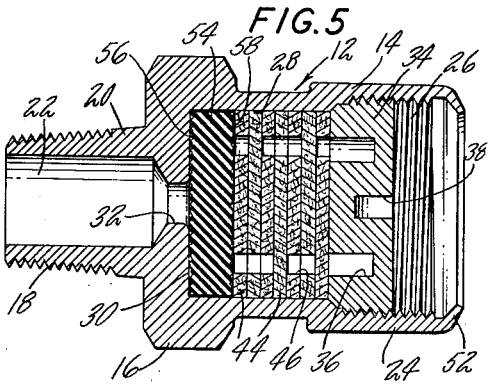
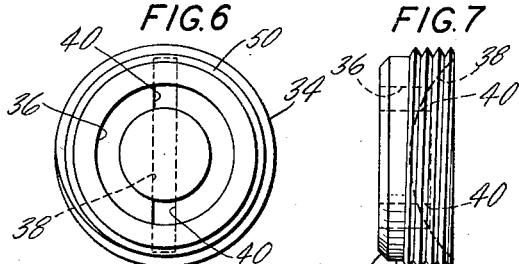
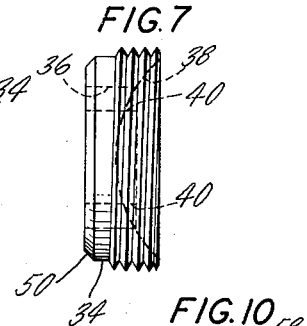
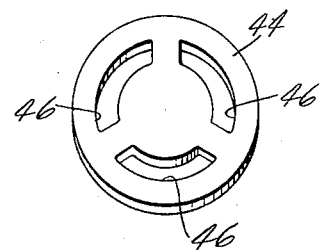
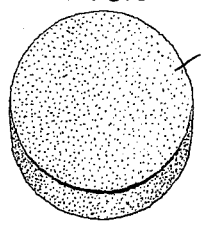
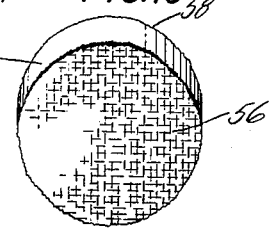
INVENTOR
ERNEST A. KRODER
BY *Lindsey, Bratzman & Jerst*
ATTORNEYS

United States Patent Office 2,713,871
Patented July 26, 1955

2,713,871

AUTOMATIC VENT VALVE

Ernest A. Kroder, Bridgeport, Conn.

Application April 22, 1950, Serial No. 157,601

9 Claims. (Cl. 137—197)

This invention relates to a valve and more particularly to a vent valve especially adapted for use in automatically venting air from a radiator of a hot water heating system.

It is an object of the present invention to provide an air vent valve operable automatically to cycle so as alternately to open and close the valve and thereby sequentially permit and prevent escape of air from a radiator without permitting escape of any noticeable amount of water therefrom.

It is another object of the invention to provide an air vent valve constructed so as to be operable selectively to provide either restricted sequential opening for normal venting or full venting to permit rapid escape of air from the radiator as when the heating system is being filled with water, said valve being easily and accurately adjusted to normal venting conditions from full venting conditions.

It is a further object of the invention to provide in said valve automatically variable vent passage means which is also self-flushing during operation.

It is still another object of the invention to provide an air vent valve composed of relatively few components which are readily and inexpensively manufactured on automatic machinery and the assembly thereof is likewise simple and inexpensive, the valve when assembled in operative condition being capable of long life without requiring any appreciable amount of attention during use.

Details of these objects and of the invention, as well as other objects thereof, are set forth in the following specification and illustrated in the accompanying drawing froming a part thereof.

In the drawings:

Fig. 1 is a fragmentary side elevation of an exemplary hot water radiator having attached thereto an automatic vent valve embodying the principles of the present invention.

Fig. 2 is a longitudinal sectional view of a vent valve embodying the principles of the present invention and illustrated on much larger scale than in Fig. 1, said valve being illustrated in fully opened position in said figure.

Fig. 3 is a view similar to Fig. 2 but showing the valve arranged for automatic venting and illustrated in position to permit passage of air or vapor from the radiator.

Fig. 4 is a view similar to Fig. 3 but showing the valve in closed condition which it automatically assumes at the end of the venting period of the cycle.

Fig. 5 is a view similar to Fig. 3 but showing another embodiment of the invention.

Fig. 6 is a bottom plan view of a closure plug for the valve illustrated in the other figures.

Fig. 7 is a side elevation of the plug illustrated in Fig. 6.

Fig. 8 is a perspective view of one of the hygroscopic disks embodied in the valve illustrated in Figs. 2 through 5.

Fig. 9 is a perspective view of a porous disk comprising a vent passage member used in the embodiment of the invention shown in Figs. 2 through 4.

Fig. 10 is a perspective view of a disk similar to that shown in Fig. 9 but being the type used in the additional embodiment of the valve shown in Fig. 5.

Referring to the drawings, in which like reference numerals indicate like parts, Fig. 1 illustrates fragmentarily the upper portion of a radiator 10 of a hot water heating system, said radiator having an automatic air vent valve 12 attached thereto and embodying the principles of the present invention. Said air vent valve is arranged to be threaded into the usual vent opening provided in radiators of this nature. The automatic air vent valve 12 comprising the present invention is illustrated in detail, in its several embodiments, in Figs. 2 through 10.

Referring to Figs. 2 through 4, in which one embodiment of the automatic air vent valve is illustrated, said valve comprises a casing or housing 14 which may readily and inexpensively be formed on an automatic screw machine from standard bar stock of brass or any other suitable, preferably non-corrodible material. For example, the bar stock may be hexagonal so as to automatically provide a hexagonal base 16 which may be engaged by a wrench for purposes of tightly threading the valve into the threaded opening in the radiator 10. One end of the housing 14 is provided with external pipe threads 18 formed on a portion 20 having a reduced diameter and having an internal aperture 22 extending longitudinally through the portion 20. The other end portion 24 of the housing 14 is preferably cylindrical and comprises a sleeve having internal threads 26. A cylindrical cavity 28 extends from the threads 26 into the hexagonal base 16, terminating in a transverse planar surface 30 comprising a seat surrounding a restricted inlet orifice 32 which communicates with the longitudinal aperture 22.

The end 24 of the housing 14 threadably supports a plug 34 for movement longitudinally of the valve 12, said plug being in the nature of a thick disk. The inner end of the plug as viewed in Figs. 2 through 5 is provided with an annular groove 36 extending into the plug. The other or outer end of the plug is provided with an arcuate groove 38 which extends inwardly sufficiently, as illustrated in Figs. 2 and 7, to intersect the inner end of the annular groove 36 and thereby provide a pair of apertures 40 comprising exit means for air and vapor escaping from the valve 12, as will be described in greater detail hereinafter. This arrangement of forming exit apertures is very inexpensive to manufacture and the arcuate groove 38 simultaneously affords ready means for receiving a screw driver bit for purposes of adjusting the plug 34 longitudinally of the valve.

Positioned within the cylindrical cavity 28 and having one face disposed against the planar surface 30 is a compressible member 42 which is disk-like in shape. In the embodiment of the invention illustrated in Figs. 2 through 4, said member 42 is formed of sponge rubber-like material comprising, for example, natural rubber, synthetic rubber, or one of a number of silicon rubbers. The cellular nature of the sponge rubber-like material will provide air passages through the member 42 when in expanded condition, as illustrated in Figs. 2 and 3.

Positioned between the member 42 and plug 34 is a plurality of disks 44 arranged in a stack as illustrated in Figs. 2 through 4. The disks 44 are formed from hygroscopic material having either a paper or fiber base and capable of substantial expansion in a direction transverse to the plane of the disk upon becoming moistened. In some types of disks of this nature, expansion of the order of fifty per cent is not uncommon between the moistened and dry states of the disk. The material is also such that upon being dried from a moistened condition, the disk will automatically contract substantially to its initial thickness in the dry state as when the disk is first formed by punching or otherwise from a suitable sheet of the material.

One of the disks 44 is illustrated in perspective view in Fig. 8 and it will be seen that each of these disks is provided with a number of arcuate slots or apertures 46 which can readily be formed by punching, simultaneously with the formation of the disk, if desired. The slots 46 are of sufficient length that, when the disks 44 are arranged in stacked condition, as shown in Figs. 2 through 5, a continuous passage through the entire stack of disks will be provided for purposes of transmitting air and vapor, as well as a slight amount of moisture therethrough.

The valve 12 is illustrated in Fig. 3 in operative position for automatically venting air from a radiator. In this figure, the compressible member 42 is preferably arranged in substantially fully expanded condition, the stack of disks 44 are substantially fully dried and in contracted condition, as well as being substantially in engagement with one surface of the member 42 and the inner face of the plug 34. It is not generally necessary, however, that the disks 44 or member 42 be under any compression in this condition.

In both Figs. 3 and 4, it will be seen that the plug 34 is threaded inwardly to its fullest extent within the housing 14, said extent being determined by suitable stop means comprising an annular conical edge 48 on the plug which is complementary to an annual conical shoulder or face 50 within the housing 14 between the threads 26 and one end of the cylindrical cavity 28. When the edge 48 of the plug is threaded into engagement with shoulder 50, the engagement is practically that of a ground fit and is therefore watertight so as to prevent seepage of moisture between the threads of the plug and housing. In the preferred embodiment of the invention, the number and thickness of the disks 44 are such that when the plug 34 is threaded inwardly to its fullest extent just described, the member 42 and disks 44 will preferably substantially fully occupy the cylindrical cavity 28 while being under no or substantially no compression. When the components of the valve are disposed in the positions thereof illustrated in Fig. 3, air and vapor may enter the aperture 22 and pass through the entrance orifice 32, the pores of the member 42, the intercommunicating slots 46 of the disks 44, and be discharged through the vent apertures 40 in the plug 34. This is considered the normal venting operation of the valve 12.

Assuming that the heating system has been in operation for a certain period of time and, as is usual in hot water heating systems, a small amount of air has accumulated in the upper parts of the radiator hot water cavities, such air and possibly some vapor will be exhausted from the radiator through the inter-communicating orifices and passageways in the valve just described relative to Fig. 3. Following the discharge of all the air permitted by the position of the vent opening in the radiator, moisture will begin to pass through the intercommunicating orifices and openings in the valve shown in Fig. 3. Such moisture will pass through the pores of the member 42 and contact the hygroscopic disks 44. The disks 44 will become moistened thereby and will immediately commence to swell and expand in a direction longitudinally of the cavity 28. Such swelling will result in the member 42 being compressed against the surface 30 of the valve, thus automatically and progressively restricting the further flow of moisture through the pores of member 42. Within a relatively short time, the expansion of most or all of the stack of disks 44 will be sufficient to compress the member 42 to such an extent that all pores thereof are closed and said member will then actually serve as a gasket, as illustrated in Fig. 4, wherein the hygroscopic disks 44 are illustrated in an exemplary manner expanded and the member 42 compressed as just described. The disks 44 will have absorbed the moisture and thus expanded to close the pores in the member 42 before water reaches the vent apertures 40, thereby to avoid dripping of water from the radiator vent valve. The water-tight engagement of face 48 and shoulder 50 also serves to prevent seepage or dripping of water from the valve in that water reaching face 48 will be forced laterally inwardly for absorption by the hygroscopic disks. The compression of member 42 thus prevents passage of moisture through the embodiment of the valve illustrated in Figs. 2 through 4.

Following the closing of the valve as just described, heat from the radiator will be transmitted through the housing 14 of the valve to the moistened disks 44. The moisture in the disks will gradually be vaporized by said heat and the vapor will pass through the discharge or vent apertures 40 in the plug 34. As the disks 44 gradually dry, they will contract with the result that the member 42 will ultimately be permitted to expand by its nature and gradually automatically restore the pores therein to open condition so as again to permit passage of air and vapor through the member 42, the slots 46 in the disks 44, and the apertures 40 in the plug 34, whereupon the valve is restored to open or venting condition to permit escape of air accumulated in the radiator since the previous cycling of the valve. This cycling will automatically be repeated over a period of a few hours without any manual manipulation or adjustment.

As will be evident from Figs. 2 through 5, the valve comprising both embodiments of the present invention may easily and inexpensively be assembled merely by first inserting the member 42 within the cavity 28 and then the stack of disks 44, and finally the plug 34 is threaded into the outer end of the housing 14. Following the insertion of the plug 34, the outer end 52 of the housing 14 is swaged inward, as illustrated in Figs. 2 through 5 to form an inward directed flange comprising a stop member which will prevent removal of the plug from the housing following the assembly of the valve.

As stated above, the length of the cavity 28 and the thickness of the member 42 and the disks 44 is predetermined so that when the plug 34 is screwed inward to its fullest extent as illustrated in Figs. 3 through 5, no calibration of the valve will be necessary and the innermost position of the plug 34 will accurately and positively be determined by engagement of the conical edge 48 of the plug with the conical face 50 in the housing, such engagement being watertight as aforesaid.

The valve 12 is also capable of being opened for so-called full venting as when the heating system is being filled with water or the water therein is being replenished. For full venting, the plug 34 is readily threaded outward from engagement with the stack of disks 44 as illustrated in Fig. 2. Complete removal of the plug 34 is, of course, prevented by the flange 52. Thus, air will then very freely pass through the orifice 32 and either through or possibly somewhat around the member 42, as well as through the slots 46 in the disks 44, and then through the vent apertures 40 of the plug 34. After the discharge of the surplus air from the radiator while the valve is opened to full venting position, as illustrated in Fig. 2, the plug 34 is then screwed into its restricted, automatic venting position shown in Figs. 3 through 5, merely by inserting a screw driver in the groove 38 and rotating the plug 34 clockwise. Said plug is screwed inward to its fullest extent illustrated in Figs. 3 through 5, accurately and without guessing, due to the engagement of the conical edge 48 with conical face 50. The valve will now commence automatically to cycle, as described above.

Another embodiment of the valve is illustrated in Fig. 5 wherein the valve is provided with a compressible member 54 which, rather than being cellular, may be formed from solid, compressible rubber-like material such as natural or synthetic rubber or one of a number of silicon rubbers which are capable of long life. The member 54 is disk-like and has a somewhat smaller diameter than that of the cavity 28 so as to permit passage of air between the perimeter of the member 54 and the walls of the cavity 28 during air venting functions.

The member 54 is illustrated in perspective view in Fig.

10, and it will be seen that at least the face 56 thereof is roughened or irregular so as to provide passageways for air between the projecting portions of the irregular surface of the face 56. One example of the face 56 is illustrated in Figs. 5 and 10, the same being somewhat waffle-like. This configuration may readily be achieved by molding the sheet material from which member 54 is punched while said sheet is in contact with woven fabric, for example. The other or opposite surface 58 of the member 54 is also preferably similar to face 56. Otherwise, the embodiment of the valve 12 shown in Fig. 6 is similar to the embodiment shown in Figs. 2 through 4 in that the disks 44 and plug 34 of the valve in Fig .5 are constructed and function similarly to those illustrated in Figs. 2 through 4.

During normal automatic cycling of the valve shown in the embodiment illustrated in Fig. 5, when the disks 44 and member 42 are as illustrated in said figure, air and vapor will pass through the orifice 32 and the passageways between the projecting portions of surface 56, then around the periphery of member 54, through the passageways between the projections of surface 58, and through the slots 46 in disks 44 and the discharge apertures 40 in plug 34. After the excess air has been discharged from the valve in the manner just described, and moisture engages the hygroscopic disks 44, they will swell and expand longitudinally of the housing 14 so as to compress the member 54. Such compression will progress until the surface 56 adjacent surface 40 of the housing will be compressed into smooth flattened condition and thereby close the passageways between the projecting portions of the uneven surface 56, thereby closing the valve. The cycle then progresses by the disks 44 gradually drying, as explained in conjunction with the embodiment shown in Figs. 2 through 4, the disks thereby contracting and ultimately permitting expansion of member 54 until the passageways between the projecting portions of the surface 56 are restored so as to permit passage of air therethrough during the next cycling of the valve.

It will be seen from the foregoing that the present invention provides several embodiments of air venting valves capable of automatic functioning without adjustment or manual manipulation, such automatic functioning being possible over long periods of time without attending the valve. Full venting of the valves is also possible merely by unscrewing the plug to its outermost position and said plug may thereafter be restored quickly and accurately to its automatic cycling position merely by threading the plug inwardly to its fullest extent. The compressible members in the several embodiments of the invention are also such as to be not only capable of long life but are self-flushing in operation as when the members 42 and 54 are compressed. Manufacture of all of the components of the valve may be performed on automatic machinery and the assembly of the components may be easily and quickly performed in an inexpensive manner. The valve is fool-proof in operation and capable of functioning automatically for long periods of time without adjustment of any kind. Also, when functioning during normal automatic venting, no seepage of moisture is possible between the threads of the plug and housing.

While the invention has been illustrated and described in its several preferred embodiments and has included certain details, it should be understood that the invention is not to be limited to the precise details herein illustrated and described since the same may be carried out in other ways, falling within the scope of the invention as claimed.

I claim as my invention:

1. An automatic air vent valve for a radiator of a hot water heating system and comprising in combination, a housing having an inlet in one end, a compressible member of rubber-like material having passageways when in expanded condition and positioned within said housing adjacent the inner end of said inlet, hygroscopic means adjacent the end of said member opposite said inlet, and a plug supported by the other end of said housing, said means upon being moistened by water or vapor being expansible between said plug and compressible member and operable to compress said member and close said passageways thereof, thereby to prevent passage of fluid through said valve.

2. An automatic air vent valve for a radiator of a hot water heating system and comprising in combination, a housing having an inlet in one end and a seat surrounding the inner end of said inlet, a compressible member of rubber-like material positioned within said seat and containing passageways when in expanded condition, hygroscopic means positioned within said housing adjacent the end of said member opposite said inlet, a plug supported by said housing for movement longitudinally of said housing into and out of engagement with said hygroscopic means, an internal annular shoulder in said housing, and a complementary annular face on said plug adapted to engage said shoulder to limit movement of said plug toward said hygroscopic means and to seal against the flow of moisture between said plug and housing, said hygroscopic means upon being moistened by water or vapor being expansible between said plug and compressible member and operable to compress said member against said seat and close said passageways thereof thereby to prevent passage of fluid through said valve.

3. An automatic air vent valve for a radiator of a hot water heating system and comprising in combination, a housing having an inlet in one end, a compressible member of rubber-like material containing passageways when in expanded condition and positioned within said housing adjacent the inner end of said inlet, an apertured plug supported by the other end of said housing for movement longitudinally thereof, and a stack of apertured hygroscopic disks positioned within said housing between said plug and member, said disks upon being moistened by water or vapor being expansible between said plug and member and operable to compress said member and close said passageways thereof thereby to prevent passage of fluid through said valve.

4. An automatic air vent valve for a radiator of a hot water heating system and comprising in combination, a housing having an inlet in one end, a compressible member containing passageways when in expanded condition and positioned within said housing adjacent the inner end of said inlet, a plug threadably supported by the other end of said housing for movement longitudinally thereof, said plug having an annular groove extending thereinto from the inner end thereof and a slot extending longitudinally thereinto from the other end thereof and intersecting said annular groove to provide an exit opening for said valve, and apertured hygroscopic means positioned within said housing between said plug and member, said hygroscopic means upon being moistened by water or vapor being expansible between said plug and member and operable to compress said expansible member and close said passageways thereof thereby to prevent passage of fluid through said valve.

5. An automatic air vent valve for a radiator of a hot water heating system and comprising in combination, a housing having an inlet in one end, a compressible porous rubber-like disk positioned in a seat in said housing adjacent said inner end of said inlet and having one surface disposed over said inlet, hygroscopic means disposed against the other surface of said disk, and a regulating plug supported by the other end of said housing for movement toward and from said hygroscopic means, said means upon being moistened by water or vapor being expansible between said plug and compressible disk and operable to compress said disk against the seat therefor and close the pores of said disk thereby to prevent passage of fluid through said valve.

6. An automatic air vent valve for a radiator of a hot water heating system and comprising in combination, a housing having an inlet in one end, and an annular seat surrounding the inner end of said inlet, a compressible disc-like member of rubber-like material positioned within said housing adjacent said seat and having an uneven surface disposed against said seat to provide passageways between the projecting portions of said surface when said member is expanded, hygroscopic means within said housing and disposed against the other surface of said member, and a regulating plug supported by the other end of said housing for movement toward and from said hygroscopic means, said means upon being moistened by water or vapor being expansible between said plug and compressible member and operable to compress said member against said seat and close said passageways thereof thereby to prevent passage of fluid through said valve.

7. An automatic air vent valve for a radiator of a hot water heating system and comprising in combination, a housing having an inlet in one end and a seat surrounding the inner end of said inlet, a compressible member positioned within said seat and containing passageways when in expanded condition, hygroscopic means positioned within said housing adjacent the end of said member opposite said inlet, an axially apertured plug threadably supported by said housing for movement longitudinally of said housing into and out of engagement with said hygroscopic means, and an annular shoulder within said housing engageable in water-tight relation by said plug to limit movement thereof toward said hygroscopic means and also prevent seepage of moisture between the threads of said plug and housing, said hygroscopic means upon being moistened by water or vapor being expansible between said plug and compressible member and operable to compress said member against said seat and close said passageways thereof thereby to prevent passage of fluid through said valve.

8. An automatic air vent valve for a radiator of a hot water heating system and comprising in combination, a housing having an inlet in one end and an annular seat surrounding the inner end of said inlet, a porous compressible rubber-like member containing passageways when in expanded condition and positioned against said seat within said housing, an apertured plug supported within the other end of said housing for movement longitudinally thereof, and a stack of apertured hygroscopic discs positioned within said housing between said plug and member, said discs upon being moistened by water or vapor being expansible between said plug and member and operable to compress said member and close said passageways thereof thereby to prevent passage of fluid through said valve.

9. An automatic air vent valve comprising in combination, a housing having an inlet in one end, a compressible member of elastic material containing passageways when in expanded condition and positioned within said housing adjacent the inner end of said inlet, a plug supported by the other end of said housing for movement longitudinally thereof, and a stack of hygroscopic disks positioned within said housing between said plug and member, each of said disks having a plurality of apertures offset from the center and located relatively near the periphery of the disks, said disks upon being moistened by water or vapor being expansible between said plug and member and operable to compress said member and close said passageways thereof thereby to prevent passage of fluid through said valve.

References Cited in the file of this patent
UNITED STATES PATENTS

| | | |
|---|---|---|
| 1,575,247 | Anderson | Mar. 2, 1926 |
| 2,153,726 | Scoppola | Apr. 11, 1939 |
| 2,331,431 | Simoneau | Oct. 12, 1943 |
| 2,467,217 | Mikeska | Apr. 12, 1949 |